US008836333B2

(12) United States Patent
Findeklee

(10) Patent No.: US 8,836,333 B2
(45) Date of Patent: Sep. 16, 2014

(54) RF POWER SPLITTER FOR MAGNETIC RESONANCE SYSTEM

(75) Inventor: Christian Findeklee, Norderstedt (DE)

(73) Assignee: Koninklijke Philips N.V., Eindhoven (NL)

( * ) Notice: Subject to any disclaimer, the term of this patent is extended or adjusted under 35 U.S.C. 154(b) by 455 days.

(21) Appl. No.: 13/059,238

(22) PCT Filed: Aug. 13, 2009

(86) PCT No.: PCT/IB2009/053572
§ 371 (c)(1),
(2), (4) Date: Feb. 16, 2011

(87) PCT Pub. No.: WO2010/020917
PCT Pub. Date: Feb. 25, 2010

(65) Prior Publication Data

US 2011/0148418 A1 Jun. 23, 2011

(30) Foreign Application Priority Data

Aug. 20, 2008 (EP) .................................... 08162661

(51) Int. Cl.
*G01V 3/00* (2006.01)
*H01P 5/12* (2006.01)

(52) U.S. Cl.
CPC ........................................ *H01P 5/12* (2013.01)
USPC .......................................................... 324/318

(58) Field of Classification Search
USPC .................................................. 324/300–322
See application file for complete search history.

(56) References Cited

U.S. PATENT DOCUMENTS

| | | | | |
|---|---|---|---|---|
| 4,309,666 | A | 1/1982 | Ito et al. | |
| 5,132,621 | A | 7/1992 | Kang | |
| 6,489,589 | B1 | 12/2002 | Alexander | |
| 6,727,656 | B1 | 4/2004 | Pelletier | |
| 6,969,992 | B2 * | 11/2005 | Vaughan et al. | 324/318 |
| 7,088,104 | B2 * | 8/2006 | Bottomley | 324/328 |
| 7,633,293 | B2 * | 12/2009 | Olson et al. | 324/318 |
| 2002/0075075 | A1 | 6/2002 | Sasaki | |
| 2004/0263283 | A1 | 12/2004 | Ji | |
| 2007/0080768 | A1 | 4/2007 | Lee | |
| 2007/0273377 | A1 | 11/2007 | Yang et al. | |

FOREIGN PATENT DOCUMENTS

| | | | |
|---|---|---|---|
| GB | 2282008 | A | 3/1995 |
| JP | 2005094654 | A | 4/2005 |
| JP | 2006254202 | A | 9/2006 |
| WO | 2004048990 | A1 | 6/2004 |
| WO | 2006103635 | A1 | 10/2006 |

* cited by examiner

*Primary Examiner* — Dixomara Vargas

(57) ABSTRACT

A radio frequency transmission system for a magnetic resonance system includes a radio frequency power amplifier generating an input radio frequency signal that excites magnetic resonance in target nuclei and is designed for feeding an impedance $Z_0$, and a multi-channel radio frequency coil having N radio frequency channels where N>1. Further, a power splitter includes (i) a parallel radio frequency connection point at which the N channels of the radio frequency coil are connected in parallel to define an output impedance at the parallel radio frequency connection point, and (ii) an impedance matching circuit connecting the radio frequency power amplifier with the radio frequency connection point and configured to provide impedance matching between the radio frequency power amplifier and the output impedance at the connection point.

15 Claims, 4 Drawing Sheets

RF POWER SPLITTER FOR MAGNETIC RESONANCE SYSTEM

FIELD OF THE INVENTION

The following relates to the radio frequency power arts, electronic arts, magnetic resonance arts, and related arts. It is described with illustrative application to magnetic resonance systems for imaging, spectroscopy, or so forth. However, the following will find more general application in radio frequency power circuitry generally, in microwave circuits and devices generally, and so forth.

BACKGROUND OF THE INVENTION

In a typical magnetic resonance system for imaging or spectroscopy, one radio frequency power amplifier is used for the transmit phase (that is, for magnetic resonance excitation). The output of the amplifier is fed into two channels of a quadrature "whole body" transmit coil, namely into the 0° phase "I" channel and the 90° phase "Q" channel. Coupling of the amplifier with the I and Q channels of the quadrature transmit coil is typically accomplished using a so-called "hybrid" coupler, which introduces a 90° phase shift for the Q channel, and uses a load for reflected power.

Another type of coil is a multi-element body coil. Such a coil includes a plurality of independently drivable conductors that can be driven in various ways by a corresponding plurality of radio frequency power amplifiers to provide substantial control over the transmit $B_1$ field, so as to accommodate different subject loads and other factors. Such a multi-element body coil can be constructed, for example, as a degenerate birdcage coil, or as a set of rods connected with a radio frequency screen so as to be drivable in a transverse electromagnetic (TEM) mode. More generally, one can employ a multi-channel radio frequency coil, such as a multi-element body coil or an array of surface coils or other local coils, to generate a highly spatially tunable $B_1$ transmit field.

Multi-element body coils coupled with a corresponding multiple number of radio frequency power amplifiers represent a substantial increase in system complexity and cost as compared with a quadrature body coil driven by a single power amplifier via a hybrid coupler. Accordingly, in some applications it is desired to drive a multi-channel radio frequency coil using a single radio frequency power amplifier. For example, a multi-element body coil can be driven in a quadrature operating mode using a single radio frequency power amplifier and suitable power coupling circuitry.

However, heretofore it has been found that suitable power coupling circuitry is complex. One suitable power coupler is known as a Butler matrix. For driving an N-channel multi-element body coil in quadrature operating mode, a Butler matrix circuit includes at least N/2+N/4+ . . . +N/N hybrid couplers combined with loads and cables of defined length. For example, a Butler coupling matrix configured to drive an 8-channel multi-element body coil in quadrature requires 8/2+8/4+8/8=7 couplers in the Butler matrix. The Butler matrix also exhibits substantial power loss, and is complex to construct because each of the N/2+N/4+ . . . +N/N couplers and the corresponding cable lengths have to be adjusted to achieve the requisite impedance and phase matching.

The following provides new and improved apparatuses and methods which overcome the above-referenced problems and others.

SUMMARY OF THE INVENTION

In accordance with one disclosed aspect, a power splitter is disclosed, comprising: a parallel radio frequency connection point at which N radio frequency channels are connected in parallel, where N is a positive integer greater than one, the parallel connection of the N radio frequency channels defining an output impedance at the connection point; and an impedance matching circuit connected with the radio frequency connection point and configured to provide impedance matching between the output impedance at the connection point and an input radio frequency signal source designed for feeding an impedance $Z_0$.

In accordance with another disclosed aspect, a radio frequency transmission system is disclosed for use in a magnetic resonance system, the radio frequency transmission system comprising: a radio frequency power amplifier configured to generate an input radio frequency signal at a radio frequency that excites magnetic resonance in target nuclei and designed for feeding an impedance $Z_0$; a multi-channel radio frequency coil having N radio frequency channels, where N is a positive integer greater than one; and a power splitter including (i) a parallel radio frequency connection point at which the N radio frequency channels of the multi channel radio frequency coil are connected in parallel to define an output impedance at the parallel radio frequency connection point, and (ii) an impedance matching circuit connecting the radio frequency power amplifier with the radio frequency connection point and configured to provide impedance matching between the radio frequency power amplifier and the output impedance at the connection point.

In accordance with another disclosed aspect, a magnetic resonance system is disclosed, comprising: a main magnet configured to generate a static main ($B_0$) magnetic field in an examination region; a set of magnetic field gradient coils configured to selectively generate magnetic field gradients in the examination region; and a radio frequency transmission system as set forth in the preceding paragraph.

One advantage resides in providing radio frequency power splitters having reduced number of components.

Another advantage resides in providing radio frequency power splitters having reduced cost of manufacture.

Another advantage resides in providing radio frequency power splitters having simplified design and tuning.

Another advantage resides in reduced signal attenuation.

Another advantage resides in providing improved methods and apparatuses for coupling a radio frequency power amplifier with a multi-channel radio frequency transmit coil of a magnetic resonance system, the improved methods and apparatuses providing advantages including reduced number of components, reduced cost of manufacture, and simplified design and tuning.

Further advantages of the present invention will be appreciated by those of ordinary skill in the art upon reading and understand the following detailed description.

BRIEF DESCRIPTION OF THE DRAWINGS

Corresponding reference numerals when used in the various figures represent corresponding elements in the figures.

DETAILED DESCRIPTION OF EMBODIMENTS

Figure 1:
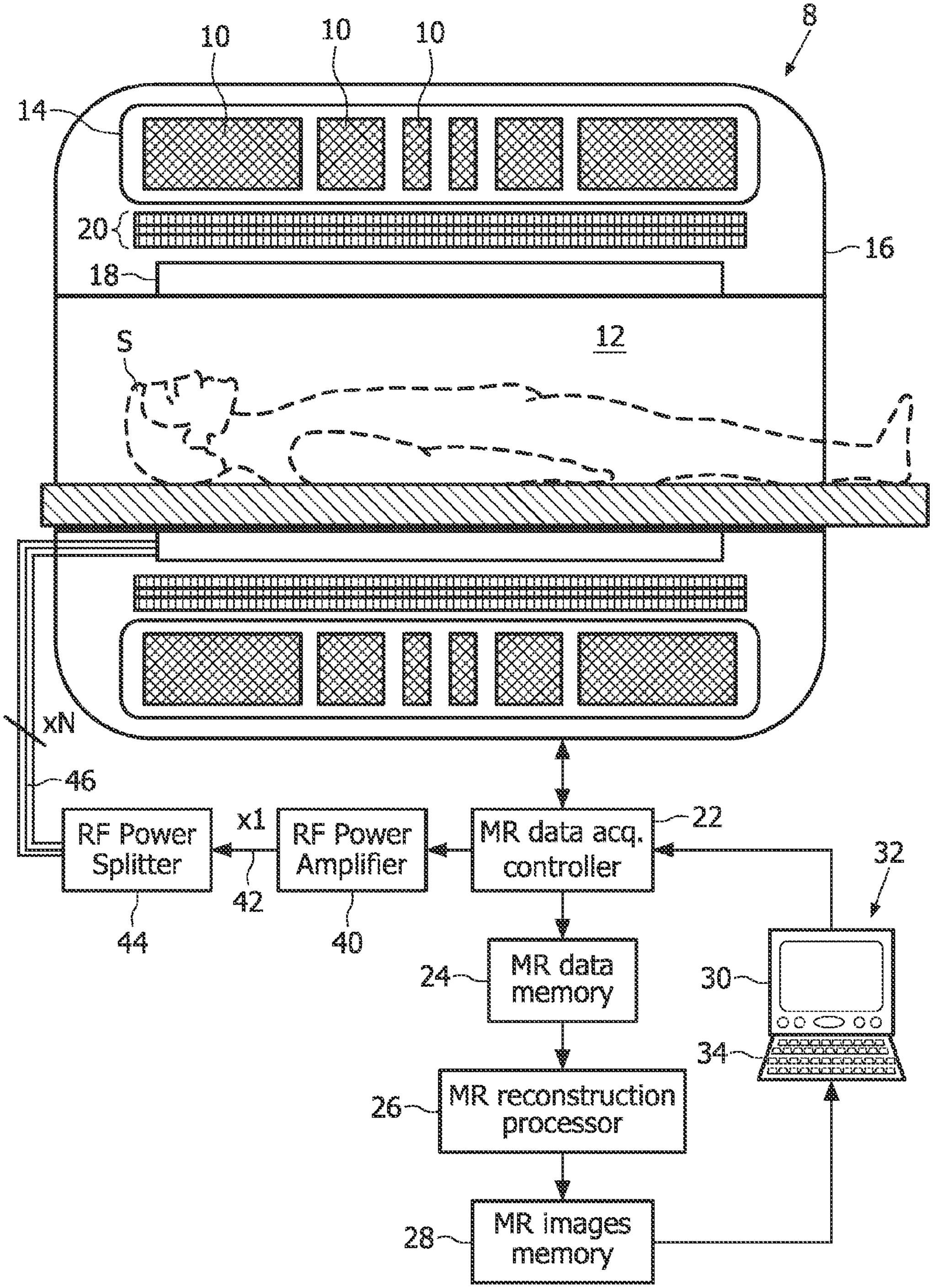
FIG. 1 diagrammatically shows a magnetic resonance system including a radio frequency splitter coupling a radio frequency power amplifier with a multi-channel radio frequency transmit coil.

With reference to FIG. 1, a magnetic resonance (MR) scanner 8 includes a main magnet 10 that generates a static main ($B_0$) magnetic field in an examination region 12. In the illustrated embodiment, the main magnet 10 is a superconducting magnet disposed in a cryogenic vessel 14 employing helium or another cryogenic fluid; alternatively a resistive or permanent main magnet can be used. In the illustrated embodiment, the magnet assembly 10, 14 is disposed in a generally cylindrical scanner housing 16 defining the examination region 12 as a cylindrical bore; alternatively, other geometries such as an open MR geometry can also be used. Magnetic resonance is excited and detected by one or more radio frequency coils, such as an illustrated multi-element body coil 18 or one or more local coils or coil arrays such as a head coil or chest coil. The excited magnetic resonance is spatially encoded, phase- and/or frequency-shifted, or otherwise manipulated by magnetic field gradients selectively generated by a set of magnetic field gradient coils 20.

The magnetic resonance scanner 8 is operated by a magnetic resonance data acquisition controller 22 to generate, spatially encode, and read out magnetic resonance data, such as projections or k-space samples, that are stored in a magnetic resonance data memory 24. The acquired spatially encoded magnetic resonance data are reconstructed by a magnetic resonance reconstruction processor 26 to generate one or more images of a subject S disposed in the examination region 12. The reconstruction processor 26 employs a reconstruction algorithm comporting with the spatial encoding, such as a backprojection-based algorithm for reconstructing acquired projection data, or a Fourier transform-based algorithm for reconstructing k-space samples. The one or more reconstructed images are stored in a magnetic resonance images memory 28, and are suitably displayed on a display 30 of a user interface 32, or printed using a printer or other marking engine, or transmitted via the Internet or a digital hospital network, or stored on a magnetic disk or other archival storage, or otherwise utilized. The illustrated user interface 32 also includes one or more user input devices such as an illustrated keyboard 34, or a mouse or other pointing-type input device, or so forth, which enables a radiologist, cardiologist, or other user to manipulate images and, in the illustrated embodiment, interface with the magnetic resonance scanner controller 22. The processing components including the magnetic resonance data acquisition controller 22 and the magnetic resonance reconstruction processor 26 are suitably embodied by one or more dedicated digital processing devices, one or more suitably programmed general purpose computers, one or more application-specific integrated circuit (ASIC) components, or so forth.

With continuing reference to FIG. 1, in transmit mode the illustrated multi-element body coil 18 is driven by a radio frequency power amplifier 40 controlled by the magnetic resonance data acquisition controller 22. The radio frequency power amplifier 40 is designed for feeding an impedance $Z_0$. In some embodiments, the radio frequency power amplifier 40 is designed for feeding an impedance $Z_0$=50 ohms. The frequency of the radio frequency transmission is selected to excite magnetic resonance in target nuclei. For example, for $B_0$=3T and the $^1$H nuclei as the target species, the multi-element body coil 18 is suitably driven at a radio frequency of about 128 MHz. More generally, for $^1$H nuclei as the target species the multi-element body coil 18 is suitably driven at a radio frequency of about (42.6 MHz/T)·$|B_0|$ where 42.6 MHz/T is the gyrometric ratio γ for $^1$H nuclei. Still more generally, the multi-element body coil 18 is suitably driven at a radio frequency of $\gamma\cdot|B_0|$ where γ is the gyromagnetic (or magnetogyric) ratio of the target nuclear species.

The radio frequency power amplifier 40 generates a power output 42; on the other hand, the multi-element body coil 18 is designed to receive N inputs, where N is greater than one, and in some embodiments is greater than two. For example in some embodiments the multi-element body coil 18 is a degenerate birdcage coil or a set of rods connected with a radio frequency screen so as to be drivable in a transverse electromagnetic (TEM) mode. The multi-element body coil can have 8 channels, 16 channels, or another number of channels that is greater than one. Instead of the illustrated multi-element body coil 18, another type of multi-channel radio frequency coil such as an array of surface coils can be used for the transmit phase.

To couple the radio frequency power amplifier 40 with its power output 42 to the N channels or inputs of the multi-element body coil 18, a radio frequency power splitter 44 is configured to split the power output 42 into N power outputs 46 connected to the N inputs or channels of the multi-element body coil 18. The power splitter 44 is constructed on the basis of the following insight: the impedances $Z_{ch}$ measured looking into the N channels of the splitter do not have to equal the impedance $Z_0$ which the driving power amplifier 40 is designed to feed. This is a consequence of the use of isolators, good matching characteristics of the multi-element body coil 18, or is a combined consequence of both factors. Accordingly, by placing the N inputs to the N channels of the multi-element body coil 18 (these inputs typically being embodied as coaxial cable inputs) into an electrically parallel configuration, the impedance looking into this parallel configuration is $Z_{ch}/N$ assuming all N channels have the same impedance $Z_{ch}$. The power splitter 44 can therefore match this impedance $Z_{ch}/N$ to the impedance $Z_0$ of the power source 40.

In some systems, each channel of the multi-element body coil 18 has the same impedance as the impedance of the driving power amplifier 40; that is, $Z_{ch}=Z_0$ for these embodiments. In this case, the parallel configuration has impedance $Z_0/N$. Some commercial amplifiers and multi-element body coils employ $Z_0=Z_{ch}$=50 ohms.

Figure 2:
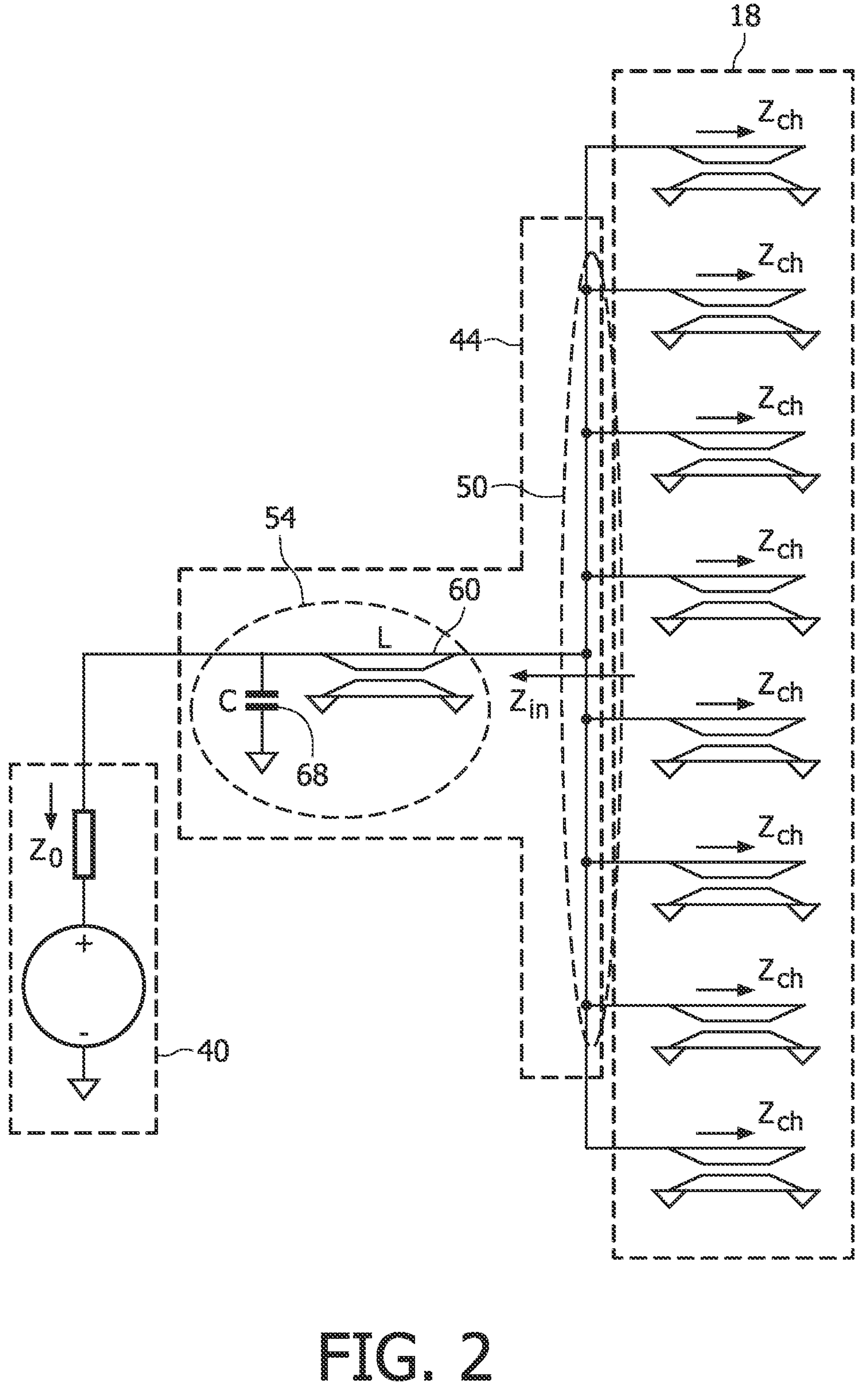
FIGS. 2 and 3 diagrammatically show an electrical schematic and physical layout, respectively, of a radio frequency power amplifier and an eight-channel radio frequency transmit coil coupled by a power splitter, suitable for use in the magnetic resonance system of FIG. 1.
Figure 3:
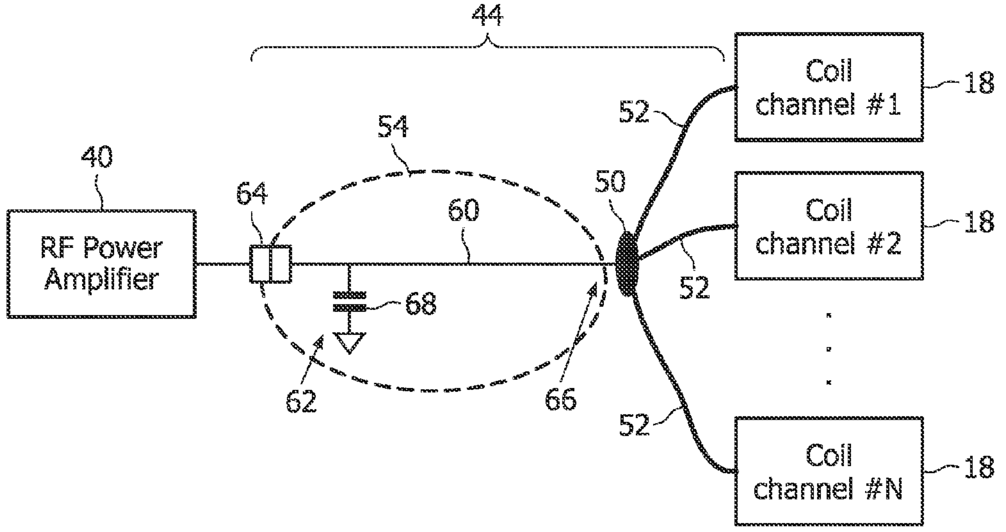
Figure 4:
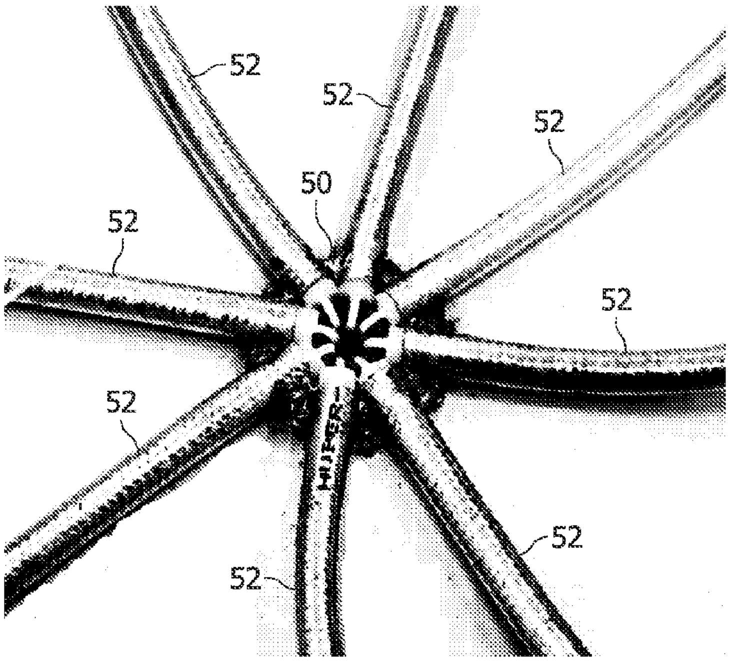
FIG. 4 diagrammatically shows a star point connection suitably used to form the parallel radio frequency connection point at which the eight radio frequency channels are connected in parallel in the power splitter of FIGS. 2 and 3.

With continuing reference to FIG. 1 and with further reference to FIGS. 2-4, an embodiment is illustrated for a configuration in which the number of channels N=8. (This is an example for illustration, and in general N can be any value greater than one, and in some embodiments greater than two.) The parallel configuration is suitably achieved using a parallel radio frequency connection point 50 at which the N radio frequency channels are connected in parallel. In a suitable configuration, the parallel radio frequency connection point 50 is a star point parallel connection at which the N ends of the N coaxial cable inputs 52 of the N radio frequency channels are electrically connected together via a wired or physical connection. (Note, the coaxial input cables 52 are labeled only in FIGS. 3 and 4). An output impedance of $Z_{ch}/N$ is defined at the parallel radio frequency connection point 50.

An impedance matching circuit 54 is connected with the radio frequency connection point 50 and is configured to match the radio frequency power amplifier 40 to the impedance $Z_{ch}/N$ at the parallel radio frequency connection point 50. In a suitable embodiment, the impedance matching circuit 54 includes a coaxial cable 60 having a first end 62 connected to the power amplifier 40, for example via a suitable connector 64 configured to detachably connect with an output of the power amplifier 40, or alternatively via a soldered or other non-detachable connection. The coaxial cable 60 also has a second end 66 connected with the parallel radio frequency connection point 50. This connection is suitably soldered, although a detachable connection such as a 1-to-N coaxial cable coupler is also contemplated. The coaxial cable 60 has a distributed inductance L. Note that the physical cable ends 62, 66 and the detachable connector 64 are labeled in the physical layout diagram of FIG. 3 but not in the electrical schematic of FIG. 2.

If the distributed inductance L is insufficient by itself to achieve impedance matching between the radio frequency power amplifier 40 that is designed for feeding an impedance $Z_0$ and the output impedance $Z_{ch}/N$ at the parallel radio frequency connection point 50, then additional components such as an illustrated capacitance 68 having capacitance C can be included to achieve the impedance-matching condition $Z_{in}=Z_{ch}/N$. The capacitance 68 can be embodied by one capacitor (as illustrated), or by two or more capacitors connected at opposite ends 62, 66 of the coaxial cable 60 and/or at one or more intermediate points along the coaxial cable 60. Due to the distribution of the distributed inductance L along the coaxial cable 60, the impedance of the combination of elements 60, 68 may vary depending upon the arrangement of one or more capacitors. It is also contemplated to use a distributed capacitance constructed, for example, by using an electrical conductor disposed alongside, inside of, or surrounding the coaxial cable 60, or another circuit topology providing the requisite impedance matching. Other suitable topologies for the impedance matching circuit include, for example: a quarter-wave transmission line in which the impedance is the geometrical mean value of the impedances to be matched; an L-network; a Pi-network; a transformer in which impedance changes with winding ratio squared; or so forth.

The matching circuit 54 that achieves the matching condition $Z_{in}=Z_{ch}/N$ can be determined in various ways. For example, values for the distributed inductance L and the capacitance C can be estimated based on known values for the input impedance $Z_0$ of the driving power amplifier 40 (for example, $Z_0$=50 ohms for some commercial power amplifiers) and for the impedance $Z_{ch}$ for each of the N channels of the multi-channel radio frequency coil 18 (for example, $Z_{ch}$=50 ohms for some multi-element body coil designs). The length of the coaxial cable 60 and the capacitance C of a main capacitor can be selected to implement these estimated values for L and C, respectively. A tuning capacitor is optionally also included to enable fine-tuning of the matching circuit impedance based on impedance measurements performed using a network analyzer or other diagnostic device.

In the illustrated embodiments, all N channels have the same impedance $Z_{ch}$. More generally, if the N channels have respective impedances $Z_1, Z_2, \ldots, Z_N$ then the impedance looking into the parallel configuration is $$Z_{in} = \frac{1}{1/Z_1 + 1/Z_2 + \ldots + 1/Z_N}$$

which is then matched to the radio frequency power amplifier 40 designed for feeding an impedance $Z_0$ by the impedance matching circuit 54.

In FIG. 3, the N coaxial input cables 52 that feed the N channels of the multi-element body coil 18 are drawn of arbitrary length. In some embodiments, the lengths of the cables 52 are selected to achieve selected phases for the N elements, so as to achieve a quadrature operating mode or other selected operating mode. In other embodiments, additional tuning elements such as capacitors are added to achieve desired phase characteristics for the N channels.

Figure 5:
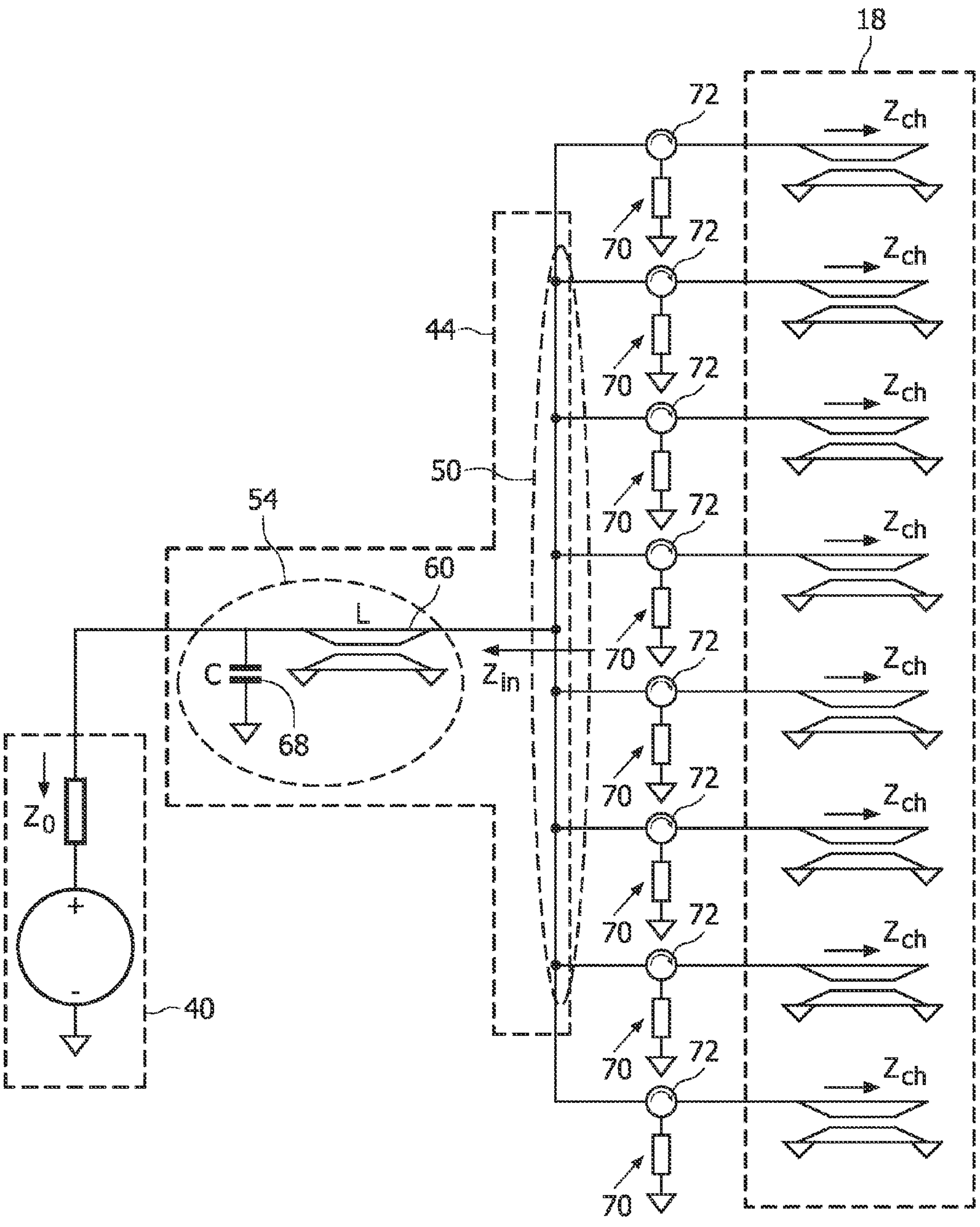
FIG. 5 shows a diagrammatic electrical schematic of a radio frequency power amplifier and an eight-channel radio frequency transmit coil coupled by a power splitter which is a variant of the power splitter of FIGS. 2 and 3, and which is also suitable for use in the magnetic resonance system of FIG. 1.

With reference to FIG. 5, another potential issue is power reflection. While this can be reduced or eliminated by impedance matching, variations amongst the N channels or other factors can result in some power reflection from one, two, some, or all of the N channels of the multi-element body coil 18. To address this issue, the variant electrical schematic of FIG. 5 illustrates an isolator element 70 interposed at the input of each of the N=8 channels of this embodiment. The illustrated isolator elements 70 each includes a three-terminal circulator element 72 having two terminals interposed between the parallel radio frequency connection point 50 and the coil channel, and a third terminal connected with a resistive load. For example, the load can be a 50 ohm resistor in the case of $Z_{ch}$=50 ohm impedance. The isolators can be placed at other points in the circuit. For example, to provide space for accommodating the isolators they may be placed at the output. Optionally, switches are placed between splitter and the circulators (or other isolators) so as to be able to feed the multi-element body coil either as illustrated in FIG. 5, or by using individual amplifiers to drive the different channels.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof. In the claims, any reference signs placed between parentheses shall not be construed as limiting the claim. The word “comprising” does not exclude the presence of elements or steps other than those listed in a claim. The word “a” or “an” preceding an element does not exclude the presence of a plurality of such elements. The disclosed embodiments can be implemented by means of hardware comprising several distinct elements, or by means of a combination of hardware and software. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A power splitter comprising:

a parallel radio frequency connection point at which N radio frequency channels are connected in parallel, where N is a positive integer greater than one, the parallel connection of the N radio frequency channels defining an output impedance at the connection point; and an impedance matching circuit connected between the radio frequency connection point and an input of the power splitter, the impedance matching circuit being configured to provide impedance matching between the output impedance at the connection point and an input radio frequency signal source configured to be connected to the input of the power splitter and to feed an impedance $Z_0$.

2. The power splitter as set forth in claim 1, wherein the impedance of each of the N radio frequency channels is $Z_{ch}$, and the matching circuit transforms the impedance $Z_0$ to $Z_{ch}/N$ at the parallel radio frequency connection point.

3. The power splitter as set forth in either claim 1, further comprising:

N radio frequency isolators operatively connected with the N radio frequency channels.

4. The power splitter as set forth in claim 3, wherein the N radio frequency isolators include N radio frequency circulators.

5. The power splitter as set forth in claim 1, wherein the impedance matching circuit comprises:

a coaxial cable having a first end configured to connect with an input radio frequency signal source designed for feeding an impedance $Z_0$ and a second end connected with the parallel radio frequency connection point, the coaxial cable having a distributed inductance.

6. The power splitter as set forth in claim 5, wherein the impedance matching circuit further comprises:

a capacitance electrically connected with the coaxial cable such that the distributed inductance of the coaxial cable and the connected capacitance cooperatively define the matching circuit impedance.

7. The power splitter as set forth in claim 5, wherein lengths of coaxial cables connecting the parallel radio frequency connection point with the N radio frequency channels are selected to provide selected phase characteristics for the N radio frequency channels.

8. The power splitter as set forth in claim 1, wherein the N radio frequency channels have coaxial cable inputs, and the parallel radio frequency connection point comprises:

a star point parallel connection at which N ends of the N coaxial cable inputs of the N radio frequency channels are electrically connected together.

9. A radio frequency transmission system for use in a magnetic resonance system, the radio frequency transmission system comprising:

a radio frequency power amplifier configured to generate an input radio frequency signal at a radio frequency that excites magnetic resonance in target nuclei and designed for feeding an impedance $Z_0$;

a multi-channel radio frequency coil having N radio frequency channels, where N is a positive integer greater than one; and a power splitter including (i) a parallel radio frequency connection point at which the N radio frequency channels of the multi-channel radio frequency coil are connected in parallel to define an output impedance at the parallel radio frequency connection point, and (ii) an impedance matching circuit connecting the radio frequency power amplifier with the radio frequency connection point and configured to provide impedance matching between the radio frequency power amplifier and the output impedance at the connection point.

10. The radio frequency transmission system as set forth in claim 9, wherein the N radio frequency channels of the multi-channel radio frequency coil have respective impedances $Z_1$, $Z_2$, . . . , $Z_N$ which define the input impedance at the parallel radio frequency connection point as $$\frac{1}{1/Z_1 + 1/Z_2 + \ldots + 1/Z_N}.$$

11. The radio frequency transmission system as set forth in claim 9, wherein each of the N radio frequency channels of the multi-channel radio frequency coil has impedance Z0, and the matching circuit provides impedance matching between the radio frequency power amplifier designed for feeding an impedance Z0 and an impedance Z0/N at the parallel radio frequency connection point.

12. The radio frequency transmission system as set forth in claim 9, further comprising:

N radio frequency isolators connecting the N radio frequency channels of the multi-channel radio frequency coil with the parallel radio frequency connection point of the power splitter.

13. The radio frequency transmission system as set forth in claim 9, wherein the impedance matching circuit of the power splitter comprises:

a coaxial cable having a first end connected with the radio frequency power amplifier and a second end connected with the parallel radio frequency connection point, the coaxial cable having a distributed inductance; and a capacitance connected with the coaxial cable.

14. The radio frequency transmission system as set forth in claim 9, wherein the multi-channel radio frequency coil is a multi-element body coil, and the N radio frequency channels of the multi-element body coil have corresponding N coaxial cable inputs, and the parallel radio frequency connection point comprises:

a star point parallel connection at which N ends of the N coaxial cable inputs of the N radio frequency channels of the multi-element body coil are physically and electrically interconnected.

15. A magnetic resonance system comprising:

a main magnet configured to generate a static main magnetic field in an examination region;

a set of magnetic field gradient coils configured to selectively generate magnetic field gradients in the examination region; and a radio frequency transmission system as set forth in claim 9.

* * * * *